United States Patent [19]

Imoto et al.

[11] Patent Number: 5,675,425
[45] Date of Patent: Oct. 7, 1997

[54] COLOR IMAGE READING DEVICE HAVING AN OPTICAL ELEMENT FOR CREATING DOUBLE IMAGES

[75] Inventors: Yoshiya Imoto; Hirokazu Ichikawa, both of Kanagawa, Japan

[73] Assignee: Fuji Xerox Co., Ltd., Tokyo, Japan

[21] Appl. No.: 422,551

[22] Filed: Apr. 13, 1995

[30] Foreign Application Priority Data

May 25, 1994 [JP] Japan .................................... 6-111000

[51] Int. Cl.⁶ .................................................. H04N 1/19
[52] U.S. Cl. ........................................ 358/513; 358/515
[58] Field of Search ................................ 358/513–514, 358/500, 515

[56] References Cited

U.S. PATENT DOCUMENTS 5,483,359  1/1996  Yumiba et al. ........................ 358/513

FOREIGN PATENT DOCUMENTS 1-237619  9/1989  Japan .
3-96063   4/1991  Japan .
4-199983  7/1992  Japan .

OTHER PUBLICATIONS

Seiichi Kawamoto, Yasuomi Watanabe, Toshiaki Kodake, Koji Tsuchiya, Yuji Nakamura, Tadakuni Narabu, "Dot Sequential CCD Color Linear Sensor Employing High-Speed Driving Method," ITEJ (Institute of Television Engineers of Japan) Technical Report vol. 16, No. 58, pp. 7–12 (Sep. 1992). (w/English language Abstract).

Primary Examiner—Stephen Brinich
Attorney, Agent, or Firm—Finnegan, Henderson, Farabow, Garrett & Dunner, L.L.P.

[57] ABSTRACT

A color image reading device for reading a document image imaged on a line image sensor, wherein the line image sensor is a CCD including a first pixel line consisting of pixels having a first reading spectral characteristic and a second pixel line consisting of pixels having the second and third reading spectral characteristics arranged alternately; a two-layer dichroic mirror is provided on the CCD, said optical element for generating double images of an optical image corresponding to said first reading spectral characteristic and another optical image corresponding to the total of said first and second reading spectral characteristics; and the separation distance between the double images generated and imaged on the CCD by the dichroic mirror is approximately equal to the distance between said two lines of pixels on the CCD.

8 Claims, 8 Drawing Sheets

READ SIGNAL OF EACH COLOR

COLOR IMAGE READING DEVICE HAVING AN OPTICAL ELEMENT FOR CREATING DOUBLE IMAGES

BACKGROUND OF THE INVENTION

The present invention relates to a color image reading device, and more particularly to a device for receiving a color image by a combination of a two-line sensor and a dichroic mirror.

In order to effect the scanning read of a color image, four methods have been proposed.

(1) System using a monochromatic image sensor plus color change in a light-source/filter.

(2) System of using color filters for three colors dot-sequentially pasted on the pixels of one line of an image sensor.

(3) System of using three reading lines provided on a single chip of the image sensor.

(4) System of color separation by a dichroic prism into three optical paths and using three image sensors.

The system of (1) is not suitable to high-speed reading. The system of (2) conventionally uses a long intimate-contact sensor because of the high pixel density in consideration of high image quality and high image resolution, and so takes a structure of a plurality of aligned CCD chips. In this system, because of inconsistency in characteristic among the chips, the boundary between the reading areas of respective chips is conspicuous on the reading image.

Recently, it has been proposed that the above structure is used as a small-sized type sensor. Specifically, in this proposal, RGB three color pixels are aligned in a line to read the output from each of the pixels by three transfer electrodes (The technical report by the Institute of Television Engineers of Japan, i.e., JOHO NYUURYOKU 1992 'High-Speed Driving—Dot Sequential CCD Color Linear Sensor'). This proposal has a structure in which a vertical transfer function is added to the horizontal transfer electrodes adjacent in the transfer electrodes and three transfer electrodes are provided on the one side of the line of photosensitive pixels.

In this system, however, because of a structure in which three color pixels are dot-sequentially arranged, the pixel area for one color is so small that the sensitivity is lowered. Further, when 5000 pixels are used for each color in order to effect the read of A3/400SPI, the chip size is 7.5 mm with the size of 5 µm for each pixel. The large size of the chip gives rise to the problems of production cost and warp of the chip.

The system of (4) requires strict alignment of three image sensors, thereby requiring a large number of man-hours of trimming.

On the other hand, the system of (3), in which three lines of RGB pixels are formed on a semiconductor substrate, does not require the alignment working for combining three color resists. Since one chip constitutes one color, there is no changing point in the reading characteristic within the reading area.

While the reading scanning is effected, however, three reading lines do not read the same position on a document at the same time. This delays the color information read precedently using a memory, thus requiring digital correction of reading the same position at the same time.

The high-speed FIFO memory and circuit for memory control which are necessary to effect this correction require high production cost. This is an obstacle against the intention of supplying a color reading device. Since the correction (gap correction) is made in substitution of a read-time displacement for a read position displacement, the perfect uniform speed in the read scanning is premised. For this reason, variations in the scanning speed due to the vibration of a mechanism system produces a local color smear. This leads to strict requirement for stability of the scanning speed in the mechanism system, thus requiring an expensive scanning mechanism system.

Further, since different positions are read in three colors, and sharp focused illumination is effected to enhance the illumination efficiency, when the document being read floats form a platen glass, the light amount for each read color changes in unbalance. The color balance in the read data changes results in a yellow and ugly image.

In order to overcome this advantage, it has been proposed to image the image information on the same line in optical three-color separation for each of three reading lines provided on a single image sensor chip.

Figure 9:
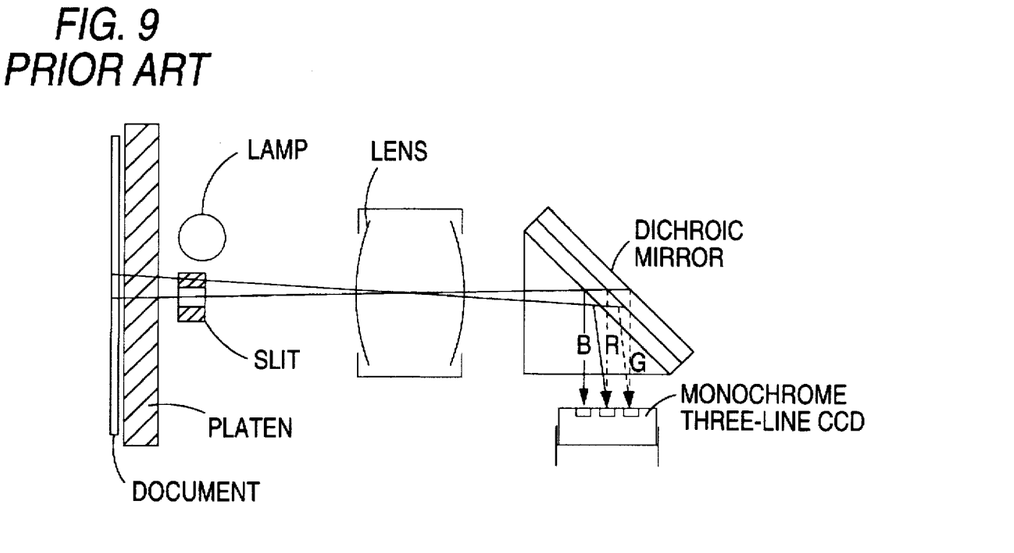
FIG. 9 is a view showing one of the prior art optical systems.

Japanese Patent Preliminary Publication No. Hei 1-237619 as shown in FIG. 9 proposes to color-separate the image imaged by a beam splitter using a multi-layer dichroic mirror into three colors.

Such a system, however, is also problematic in the accuracy of attaching the beam splitter. The beam splitter must be fabricated at a high cost. Further, the width of the optical image in the sub-scanning (or feed) direction must be restricted using a slit having a small width. If not, the slit image color-separated in three colors overlap each other to generate optical crosstalk. This requires the reading line to be limited in the sub-scanning direction using the slit having an accurate slit. Furthermore, in order to assure sufficient separation between the slit images, the gap between the three reading lines must be extended to ten and several lines. Conversely, however, in order to align the registrations of the three reading lines strictly for correction of a wide gap interval, the thicknesses of the transparent layer between the dichroic mirrors must be adjusted accurately.

Figure 10:
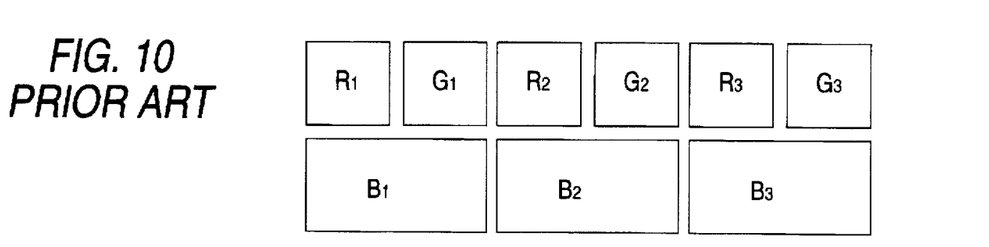
FIG. 10 is a plan view of an arrangement of pixels in another prior art.

Japanese Preliminary Publication No. Hei 4-199983 proposes the pixel arrangement of CCD whose plan view is shown in FIG. 10. This proposal intends to reduce correction memory and decrease the registration correction error due to the presence of gap interval between the reading lines.

This proposal is advantageous that reduction in the number of correction lines can decrease the registration correction error as compared with the three line sensor, and extension in the area of the B (blue) receiver improves the balance in the sensor outputs for three colors as the dot-sequential sensor.

This proposal, however, also leads to an increase in the number of correction lines in an extension mode because of the presence of one line or so of the gap interval, thus requiring an FIFO memory. This proposal, which can obtain a desired resolution by interpolation with a sensor pitch of ½ of a desired resolution, does not intend to improve the resolution in a real meaning.

Figure 11:
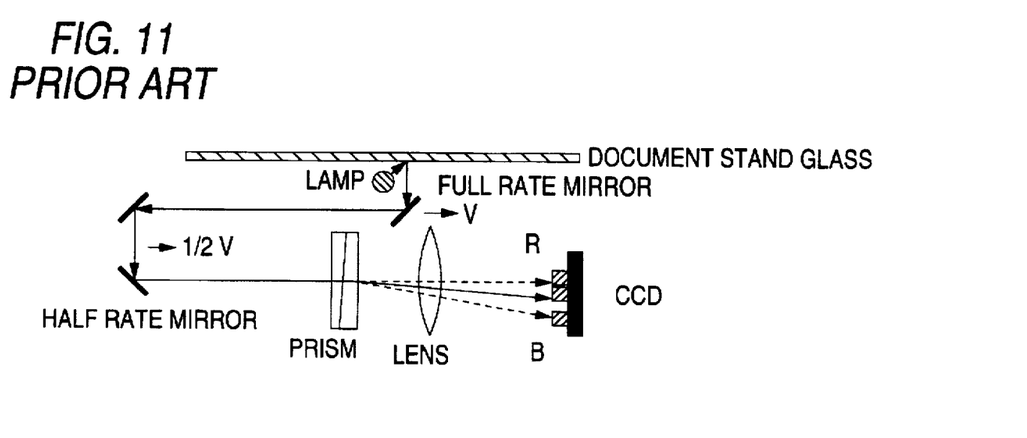
FIG. 11 is a view showing the optical system of another prior art.
Figure 12:
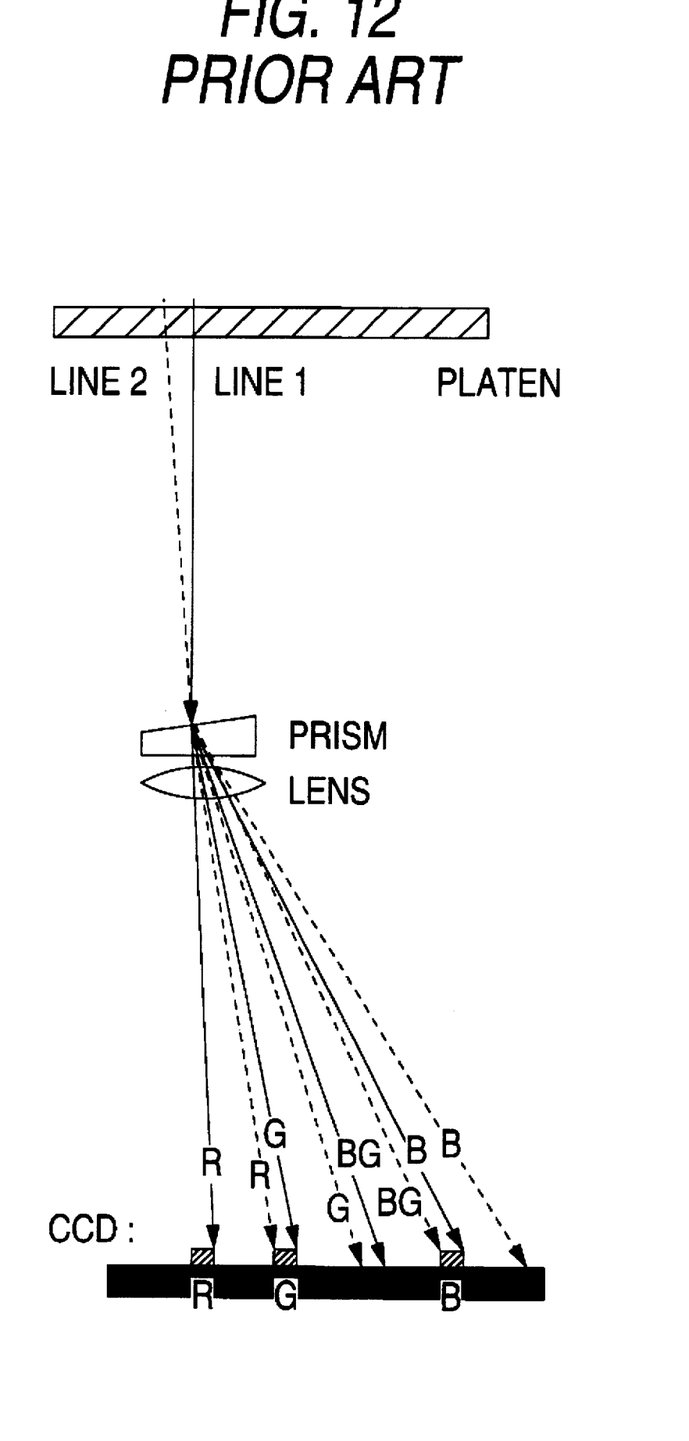
FIG. 12 is a view showing the manner of blocking the crosstalk component in FIG. 11.
Figure 13:
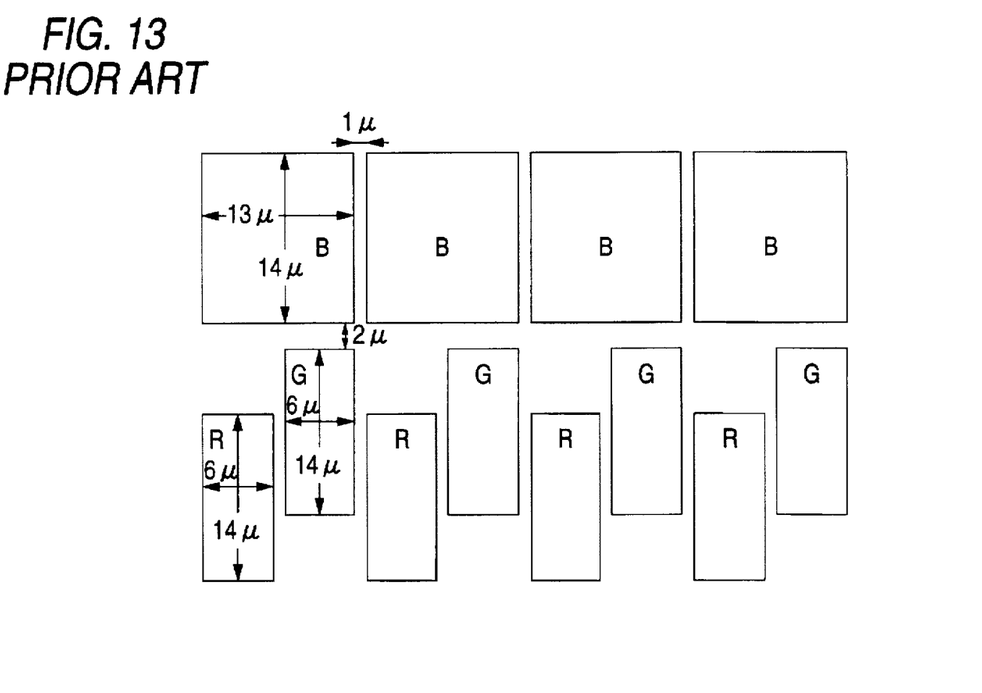
FIG. 13 is a plan view showing the arrangement of pixels in the sensor in FIG. 11.

There is a technical idea of optically correcting variations in the registration for three colors by combining a sensor having a pixel arrangement as shown in FIG. 13 (which is a modification of the sensor shown in FIG. 10) and a color separation effect by a prism. The structure based on the technical idea is shown in FIG. 11. This structure prevents the influence by the crosstalk generated in the case of FIG. 9 by blocking the crosstalk components of other colors using the on-chip filter provided on the sensor. Such a manner is shown in FIG. 12.

The system of this structure is disadvantageous that the size of the prism or a color separation element is as large as the lens diameter and the sub-scanning direction resolution of B (blue) which exhibits great color dispersion due to the color dispersion effect is slightly lowered.

Figure 14:
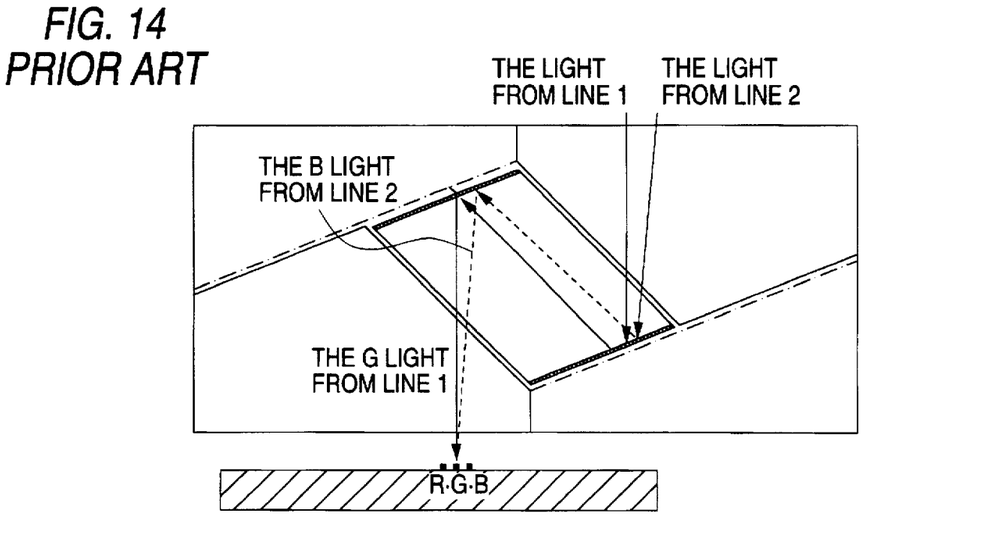
FIG. 14 is a view showing the manner of preventing the crosstalk according to still another prior art proposal.

The problem resulting from the combination of the above dichroic mirror and a three-line sensor, i.e. crosstalk can be solved by the effect on the on-chip filer on a color three-line sensor with the interval between the pixel lines shortened to two lines in a pixel-in transfer system. In this case, the color filter on the sensor is expected to prevent the crosstalk that the images with the colors with varied registrations other than the read color overlap each other. This manner is shown in FIG. 14.

The B light from line 2 of the G light from line 1 and B light from line 2 which are incident on the read pixel line of G centered on the three lines is blocked by the G-color on-chip filter on the sensor so that it does not almost reach the sensor. This on-chip filter has an effect of preventing the crosstalk.

Figure 15:
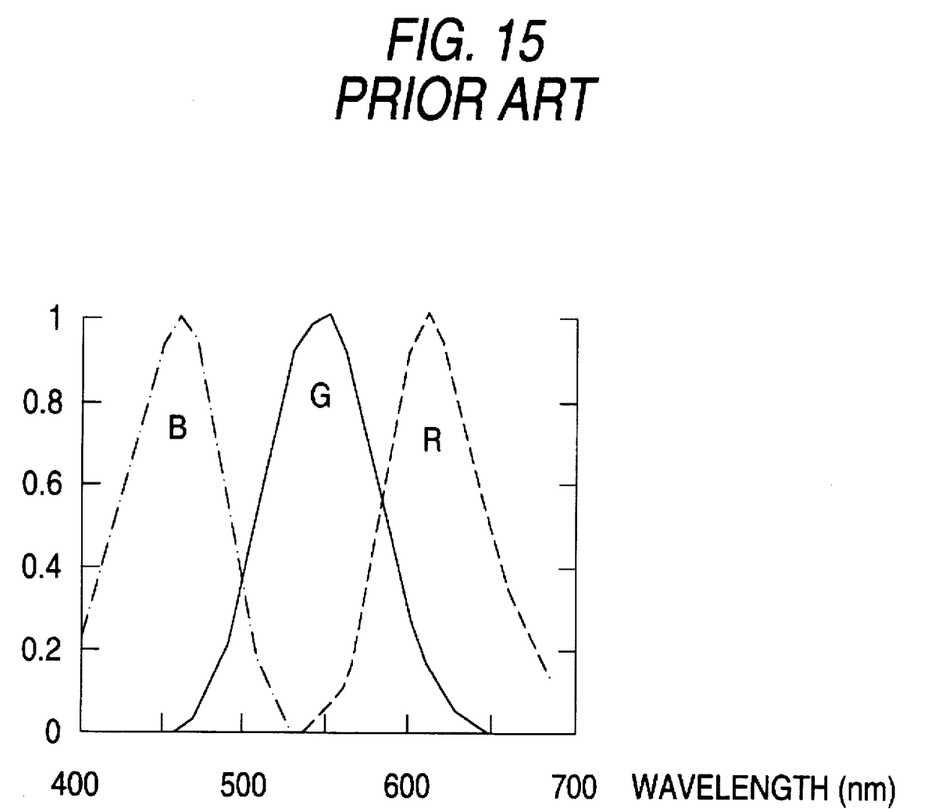
FIG. 15 is a view showing the characteristic of the color filter similar to the conventional spectral characteristic of human's eyes.

In order to make the characteristic of a color filter substantially equal to the spectral sensitivity characteristic of human's eyes, however, the spectral characteristic of three colors are caused to have color mixture from one another as shown in FIG. 15. The crosstalk causes crosstalk to be left. Particularly, great color mixture between R and G is problematic.

This proposal intends to lessen the influence of ghost due to crosstalk by arranging R and G with no color mixture from each other on both external lines of three lines where pixel lines are most apart from each other. The adjacent pixel lines overlap in their spectral characteristics and contain color mixture. The resultant color mixture generates reduction in the resolution.

The present invention has been completed in view of the problems of the prior art or several proposals. The objects of the present invention are (1) to solve the problem of correction memory cost or the registration correction error in variations in the reading scanning speed, which is attributable to electrical registration correction between color pixel lines of plural line sensors.

(2) to solve the problem of attenuation in sensitivity due to reduction in the pixel area in dot-sequential three color sensors.

(3) to solve the problem of accuracy in the registration correction generated when a slit image is optically separated into three colors to be image on a three-line sensor with a large gap for each color, (4) to solve the problem of crosstalk between the color images when the image color-separated into three colors is imaged on a three-line sensor, and (5) to prevent the structure of a dichroic mirror optical element from being complicated when a plurality of dichroic mirrors are stacked, thereby providing a device which can read the color image accurately with no color variation, at high sensitivity and with no crosstalk in simple structure.

In order to attain the above object, the color image reading device according to the present invention is characterized in that in a color image reading device for reading a document image imaged on a line image sensor, said line image sensor includes a first pixel line consisting of pixels having a first reading spectral characteristic and a second pixel line consisting of pixels having the second and third reading spectral characteristics arranged alternately;

an optical element is provided on said line image sensor, said optical element for generating double images of an optical image corresponding to said first reading spectral characteristic and another optical image corresponding to the total of said first and second reading spectral characteristics; and the separation distance between the double-images generated and imaged on said line image sensor by said optical element is approximately equal to the distance between said two lines of pixels on said line image sensor.

In this case, said first, second and third reading spectral characteristics are desired to be blue, red and green, respectively.

Further, said optical element is desired to include first and second parallel reflection planes with at least the first reflection plane on the light incident side being a dichroic reflective plane so that the entire optical element can generate dichroic double images.

Further, in this case, both said first and second layers are desired to be constituted by dichroic reflective planes which have a low reflection factor in the vicinity of 500 nm.

The above structure has the following effects.

(1) Optical three-color registration correction can solve a problem relative to electric registration correction.

(2) Distribution of three pixel lines into two lines can improve sensitivity as compared with the three-color dot-sequential sensor. Particularly, since the sensitivity of B can be increased, a combination with a light source with blue being weak such as a halogen lamp is preferable.

(3) The structure according to the present invention can increase the gap between two original lines, thereby enhancing accuracy in the registration correction.

(4) Arrangement of R and G, in which crosstalk is most problematic, on the same line can solve the problem of crosstalk. The crosstalk between B and G can be obviated by the mirror capable of cutting the light in the vicinity of 500 nm.

(5) Combination with a three-line sensor requires a three-layer dichroic mirror, thus leading to a complicate structure. The present invention, in which a two-layer dichroic mirror can be used, is simple in structure and easy in production.

DETAILED DESCRIPTION OF THE PREFERRED EMBODIMENTS

Now referring to the drawings, an explanation will be given of the color image reading device according to the present invention on the basis of several embodiments.

Figure 1:
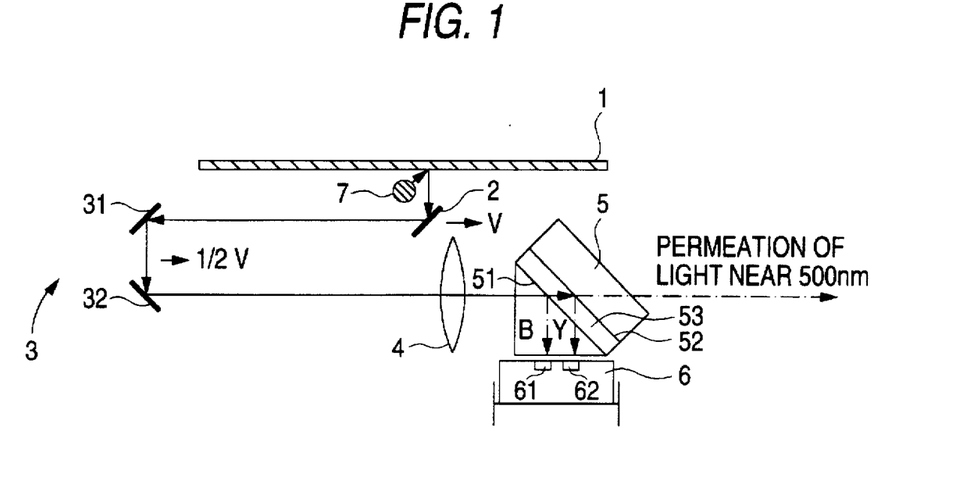
FIG. 1 is a view showing the basic arrangement of the optical system of the color image reading device according to one embodiment of the present invention.

FIG. 1 shows the basic structure of an optical system of the color image reading device according to a first embodiment. In this system, a document placed on a platen, i.e., a document stand glass 1 is imaged on a rear-stage sensor system by an imaging lens 4 through a folded optical path of a slit scanning mirror optical system consisting of a full-rate mirror 2 and a half-rate mirror 3. The full-rate mirror 2 constituting the scanning mirror optical system serves to reading-scan the document in such a manner that it moves along and adjacently to the document, integrally with a lamp 7 for illuminating the document, at a speed of v in the direction of an arrow. The half-rate mirror 3 consisting of two mirrors 31 and 32 arranged to form an angle of 90° serves to maintain the distance between the document and the imaging lens 4 in such a manner that it moves at a speed v/2 half as fast as the moving speed v of the full-rate mirror 2. Scanning of these two mirrors 2 and 3 permits the information of the document to be sequentially imaged on the sensor system.

Figure 2:
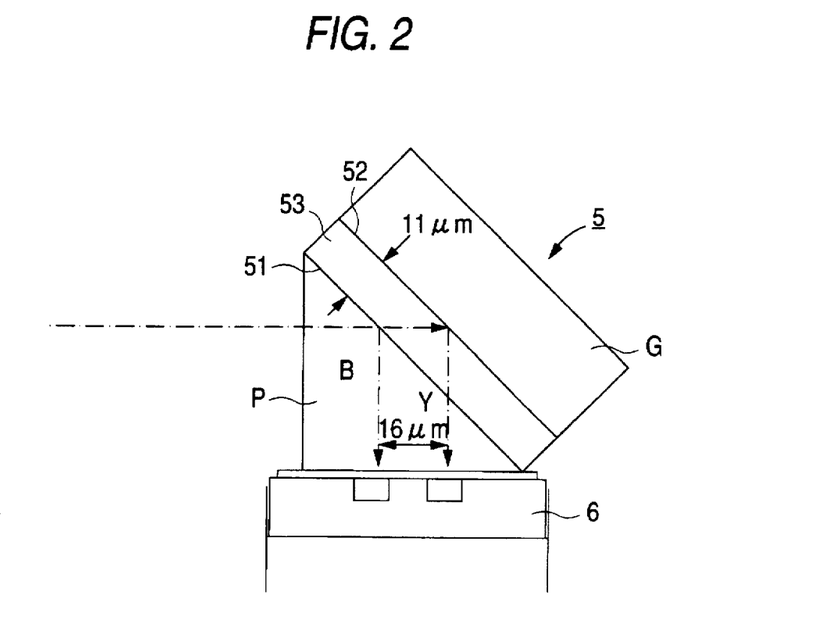
FIG. 2 is a view for explaining the concrete arrangement and function of the two-layer dichroic mirror in this embodiment.
Figure 3:
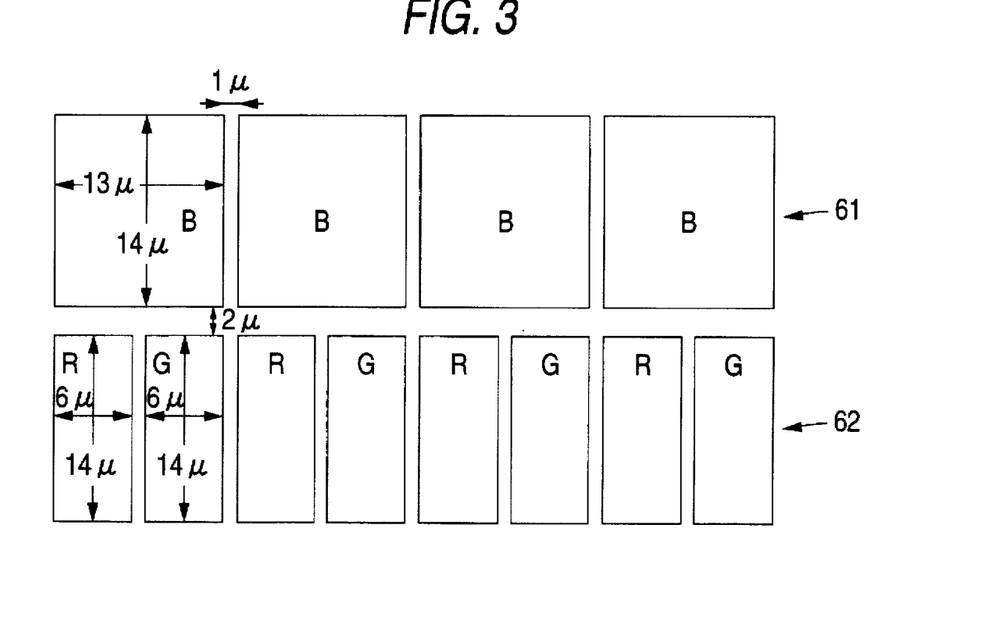
FIG. 3 is a plan view showing the arrangement of pixels of CCD.

The sensor system includes a CCD 6 having a pixel arrangement whose plan view is shown in FIG. 3 and a two-layer dichroic mirror 5 including a first layer 51, a second layer 52 and a transparent layer 53 therebetween (the first layer 51 performs B (blue light) reflection and the second layer 52 performs Y (yellow light) or normal reflection). The reflection light from the document having passed through the imaging lens 4 is separated into B light and Y light (resulting from mixture of G (green light) and R (red light)) by the dichroic mirror 5. Specifically, the B light of these two beams of light is reflected by the first layer 51 of the dichroic mirror 5 and projected on the CCD 6. On the other hand, the Y light passes through the first layer 51 of the dichroic mirror 5, is reflected by the second layer 52 which is the rear reflection layer reflecting the Y light or a normal reflection layer, passes through the facial first layer 51 again and projected on the CCD 6. In this case, since the Y light passes through the transparent layer 53, its optical path is shifted for the B light. This state is shown in FIG. 2.

Now it is assumed that in the two-layer dichroic mirror 5, the dichroic plane of the first layer 51 is separated from the reflection plane of the second layer by the transparent layer 53 maintaining these planes in parallel and having a thickness of 11 μm. The beams of light which are incident on the dichroic plane of the first layer 51 with an angle of 45° is reflected by the first layer 51 and second layer 52, respectively, and thereafter incident on the sensor plane of the CCD 6 as parallel beams of light separated from each other by 11 μm÷sin (45°)=16 μm.

Now, the pixel structure of the CCD 6 includes two lines of a first line or row 61 and a second line or row 62. As shown in FIG. 3, the first line 61 includes substantially square pixels on each of which a B-passing on-chip filter is located; and the second line 62 includes rectangular-pixels each having an area substantially half as large as the pixel in the first line 61, on which R- and G-passing filters are located alternately. Thus, the B light can be given the spectral characteristic of B by the on-chip filters and imaged on the first pixel line 61. The Y light can be given the spectral characteristics of R and G of the on-chip filters and imaged on the second pixel line 62.

Figure 4:
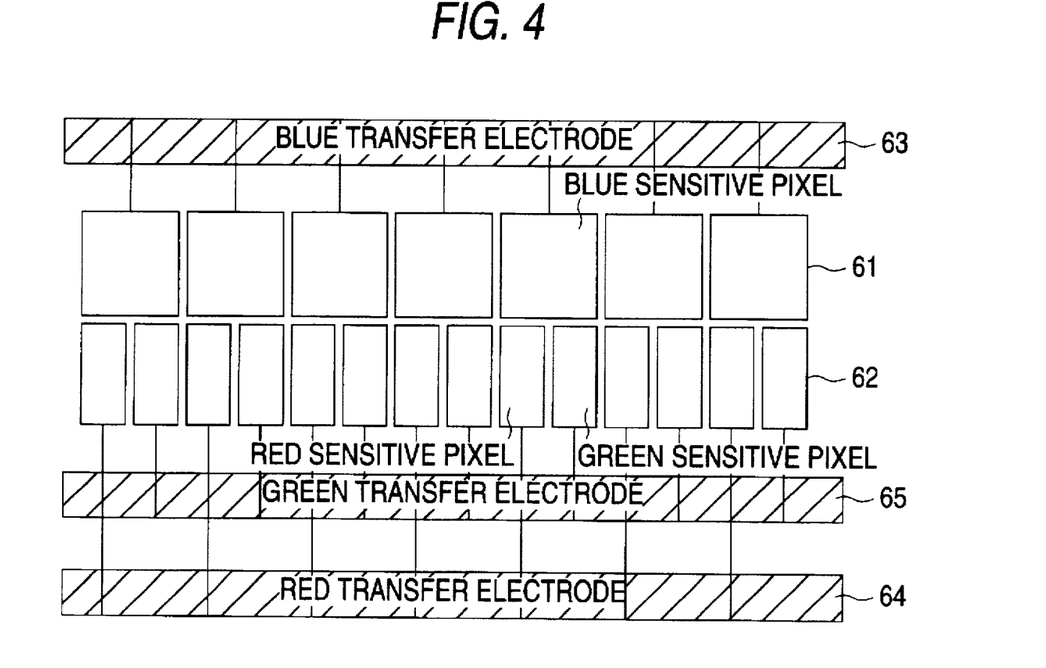
FIG. 4 is a plan view showing the arrangement of pixels of CCD and transfer electrodes.

The outputs from the reading lines 61 and 62 of the CCD 6 can be produced by arranging a transfer electrode 63 for B and transfer electrodes 64 and 65 for R and G on both outer sides of lines 61 and 62. Such an arrangement permits the gap between the two reading lines to be reduced to the limit without arranging the transfer electrode between the reading lines 61 and 62.

The system according to the present invention has the following advantages as compared with the conventional three-layer dichroic mirror plus a three-line sensor.

(1) Because the spectral element using the dichroic mirror includes only two mirror layers, the structure is simple and the production is easy.

(2) Because the color separation of R and G with more color mixture from each other is effected by the dot-sequential color filter provided on a sensor, less attenuation in MTF in the sub-scanning direction due to the crosstalk by a color separation element is generated.

(3) Even when the color mixture of the spectral sensitivity between B and G is decreased, because of its less influence on color regeneration characteristic, attenuation in MTF in the sub-scanning direction can be reduced.

(4) Because the gap between the B photosensitive pixel line and G and R photosensitive pixels lines can be decreased, there is less attenuation in MTF in the sub-scanning direction due to the crosstalk generated between B and G.

As compared with the dot sequential sensor with three pixels aligned in a line, the system according to the present invention has the following advantages.

(5) Since the light source such as a halogen lamp usually used for color reading includes a less amount of blue component, the structure of this system including blue pixels each having a large size is a desired structure and advantageous in sensitivity.

(6) Since only two colors of R and G are dot-sequential, as compared with the three-color dot sequential system, three-color unbalance of MTF in a main scanning direction due to correction of sampling pixel position by the shift of a gravitation center is small.

As compared with the two-line three-color sensor, the system according to the present invention has the following advantage.

(7) Since correction for the gap between the pixel lines is not effected by memory, advantages in cost and image quality are given.

The advantages of the present invention are exemplary.

The two-layer dichroic mirror 5 according to the present invention can be fabricated in the following method. For example, the dichroic plane 51 of the first layer is provided on the slope of a triangular prism P in FIG. 2, and the reflection plane of the second layer 52 is provided on a glass flat plate G. Between the reflection planes of the two layers 51 and 52, a gap is provided using a spacer having a width of 11 μm. The gap is filled with a transparent member 53. The detail of this method is described in Japanese Preliminary Publication No. Hei 3-96063.

As described in connection with FIG. 15, attenuation in MTF in the sub-scanning direction in the above items (2) and (3) is the phenomenon that the resolution in the sub-scanning direction is attenuated owing to the crosstalk of the double or triple image generated by the dichroic mirror. Both proposals shown in FIG. 14 according to the present invention intend to relax the crosstalk by blocking the images of other colors by the on-chip filters on the sensor pixels.

Figure 7:
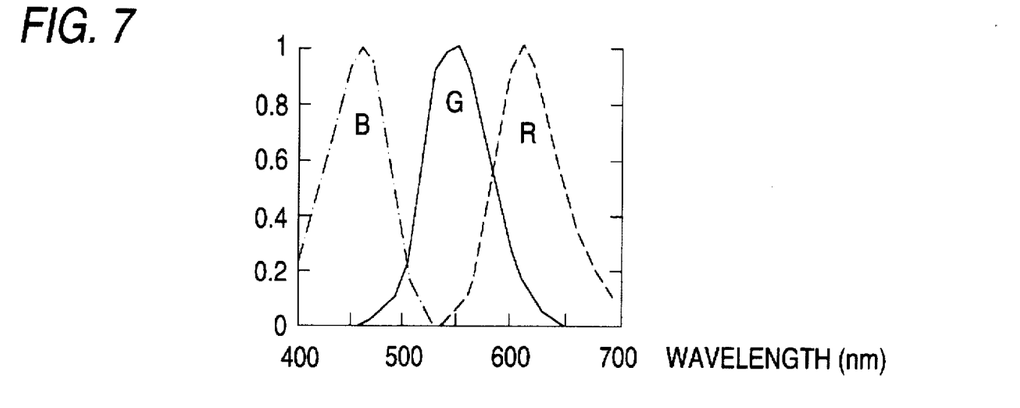
FIG. 7 is a view showing the response of the reading device in which the portion common to B and G is decreased.

In order that the spectral characteristic of the photosensitive pixels of G and R is similar to the human' eyes as shown in FIG. 7, it takes great color mixture of the spectral characteristic between G and R. For this reason, when the difference between R and G in their spectral characteristics is used to obviate the influence by crosstalk as in the prior art, it is impossible to block the images of other colors sufficiently.

In this system, the color separation of R and G is effected in a dot-sequential manner so that attenuation in MTF is not generated.

Further, the spectral sensitivity characteristic of B and G may have a small common portion. Even when these beams of light are arranged on different sensitive pixel lines to divide an optical flux, attenuation in the resolution in the sub-scanning direction due to crosstalk is small.

Since the arrangement of the two line sensor permits the transfer electrodes for taking out outputs to be provided on both outer sides of the pixel lines, the gap distance between the pixel lines can be shortened. The influence from the crosstalk remaining between B and G can be decreased as indicated in the above item (3).

The system according to this embodiment, in which the pixel size of B is three-times and that of R and G is 1.5 times as large as in the three-color dot sequential sensor in which one pixel is divided into ⅓, is advantageous in sensitivity. Particularly, in combination with a reading light source having a less amount of blue component represented by a halogen lamp, the structure in which the pixel area of B is larger than that of G and R is preferable because the three-color sensitivity balance is improved.

Generally, in the dot sequential sensor, the sampling positions of the pixels for each color are different. The gravity centers of the pixels of the different colors, therefore, must be corrected by the operation of two adjacent pixels of the same color so that they are located on the same position. In the case of the three-color dot-sequential circuit, the registration positions of other two colors are shifted by ⅓ pixel so as to be aligned with a specific color (usually G), which results in unbalance in MTF of three colors.

Figure 5:
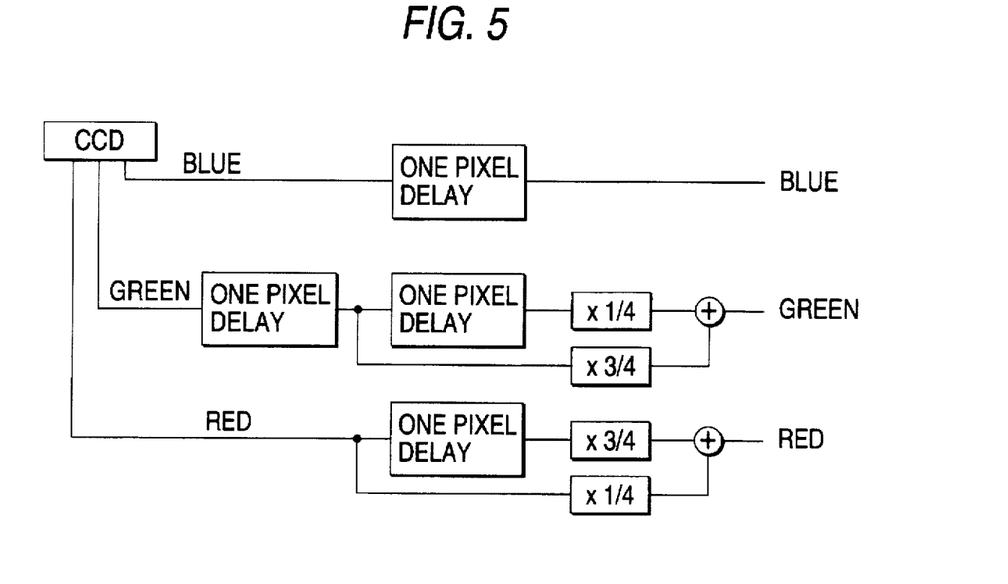
FIG. 5 is a circuit diagram showing the structure of the registration correction circuit in the main scanning direction.
Figure 6:
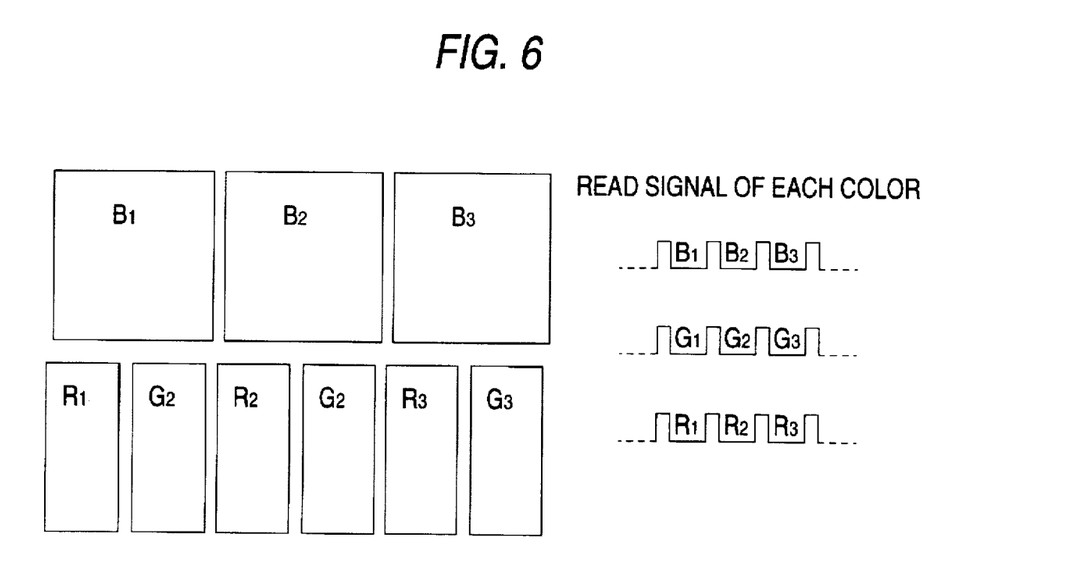
FIG. 6 is a view showing the sequence of reading three-color pixels and the corresponding read-out signals.

In the system according to the present invention, using the circuit as shown in FIG. 5, ¼ pixel correction of R and G for B is effected. The correspondence between the pixels and pixel signals at this time is shown in FIG. 6. In this correction, since the amount of correction is little and MTF is good because of the inherent small pixel size of sampling R and G, the ¼ pixel correction improves the MTF balance of RGB.

In the first embodiment, the crosstalk can be prevented by reading one of dichroic double images which are generated by the dichroic mirror 5 using the filter characteristics of the B and R.G of the CCD 6. In the actual characteristics of the on-chip filters, the rate of change in the spectral characteristic is not abrupt owing to the characteristic of color material of the filter. Therefore, decreasing the wavelength region where B and G have the sensitivity in common as shown in FIG. 7 is not so problematic in color regeneration characteristic. Actually, however, as shown in FIG. 15, such a wavelength region is left to a certain degree. This is a cause of attenuating MTF in the sub-scanning direction due to the crosstalk.

Figure 8:
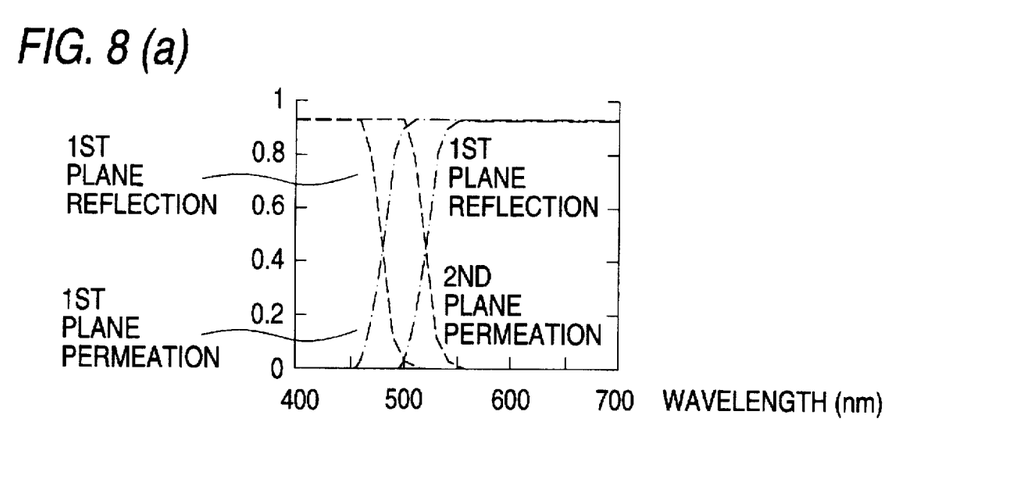
FIGS. 8(a), and 8(b) are views showing the spectral characteristic of the two-layer dichroic mirror in the second embodiment.

In order to obviate attenuation in MTF, in the second embodiment of the present invention, a dichroic mirror is used for the second plane 52 of the two-layer dichroic mirror 5, and as shown in FIG. 8A, the first plane 51 and second plane 52 are caused to have B-reflection/Y-permeation and Y-reflection/B-permeation, respectively. Further, at the wavelength in the vicinity of 500 nm which is a boundary wavelength between B and Y, as shown in FIG. 8(b), both mirrors 51 and 52 are made permeable. Thus, the component in the vicinity of 500 nm is removed from the light incident on the CCD 6 to prevent generation of crosstalk and attenuation in MTF in the sub-scanning direction. FIG. 1 also shows the manner in which the light in the vicinity of 500 nm permeates.

The color image reading device according to the present invention has been explained hitherto in connection with several embodiments. The present invention should not be limited to these embodiments but can be realized in several modifications.

As is apparent from the explanation made hitherto, the color image reading device has the following advantages.

(1) Because the spectral element using the dichroic mirror includes only two mirror layers, the structure is simple and the production is easy.

(2) Because the color separation of R and G with more color mixture from each other is effected by the dot-sequential color filter provided on a sensor, less attenuation of MTF in the sub-scanning direction due to the crosstalk by a color separation element is generated.

(3) Even when the color mixture of the spectral sensitivity between B and G is decreased, because of its less influence on color regeneration characteristic, attenuation of MTF in the sub-scanning direction can be reduced.

(4) Because the gap between the B photosensitive pixel line and G and R photosensitive pixels lines can be decreased, there is less attenuation of MTF in the sub-scanning direction due to the crosstalk generated between B and G.

(5) Since the light source such as a halogen lamp usually used for color reading includes a less amount of blue component, the structure of this system including blue pixels each having a large size is a desired structure and advantageous in sensitivity.

(6) Since only two colors of R and G are dot-sequential, as compared with the three-color dot sequential system, three-color unbalance of MTF in a main scanning direction due to correction of sampling pixel position by the shift of a gravitation center is small.

(7) Since correction for the gap between the pixel lines is not effected by memory, advantages in cost and image quality are given.

(8) Since a dichroic mirror is used for mirrors for two colors, the wavelength in the vicinity of 500 nm which permeates through both the B filter and G filter, which leads to crosstalk, among three-color filters of the CCD sensor is interrupted to prevent attenuation in MTF in the sub-scanning direction.

What is claimed is:

1. A color image reading device for reading a document image, comprising:
    a line image sensor on which a document image is imaged, consisting of
        a first pixel line with pixels having a first reading spectral characteristic, and
        a second pixel line with pixels having a second and third reading spectral characteristics arranged alternately;
    an optical element provided on said line image sensor, said optical element generating separated double images, one of said double images being an optical image corresponding to said first reading spectral characteristic and the other of said double images being an optical image corresponding to the total of said second and third reading spectral characteristics; wherein
    the separation between the separated double images being generated by said optical element and imaged on said line image sensor being approximately equal to the distance between said two lines of pixels on said line image sensor.

2. A color image reading device of claim 1, wherein said first, second and third reading spectral characteristics are blue, red and green, respectively.

3. A color image reading device of claim 1, wherein said optical element includes first and second parallel reflection planes with at least the first reflection plane on the light incident side being a dichroic reflective plane so that the entire optical element generates dichroic double images.

4. A color image reading device of claim 2, wherein said optical element includes first and second parallel reflection planes with at least the first reflection plane on the light incident side being a dichroic reflective plane so that the entire optical element generates dichroic double images.

5. A color image reading device of claim 3, wherein both said first and second layers comprises dichroic reflective planes having a low reflection factor.

6. A color image reading device of claim 4, wherein both said first and second layers comprises dichroic reflective planes having a low reflection factor.

7. A color image reading device of claim 5, wherein said low reflection factor is in the neighborhood of 500 nm.

8. A color image reading device of claim 6, wherein said low reflection factor is in the neighborhood of 500 nm.

* * * * *